April 7, 1970   L. J. KORSON   3,504,514
ROLLER BURNISHING TOOL
Filed Sept. 20, 1967
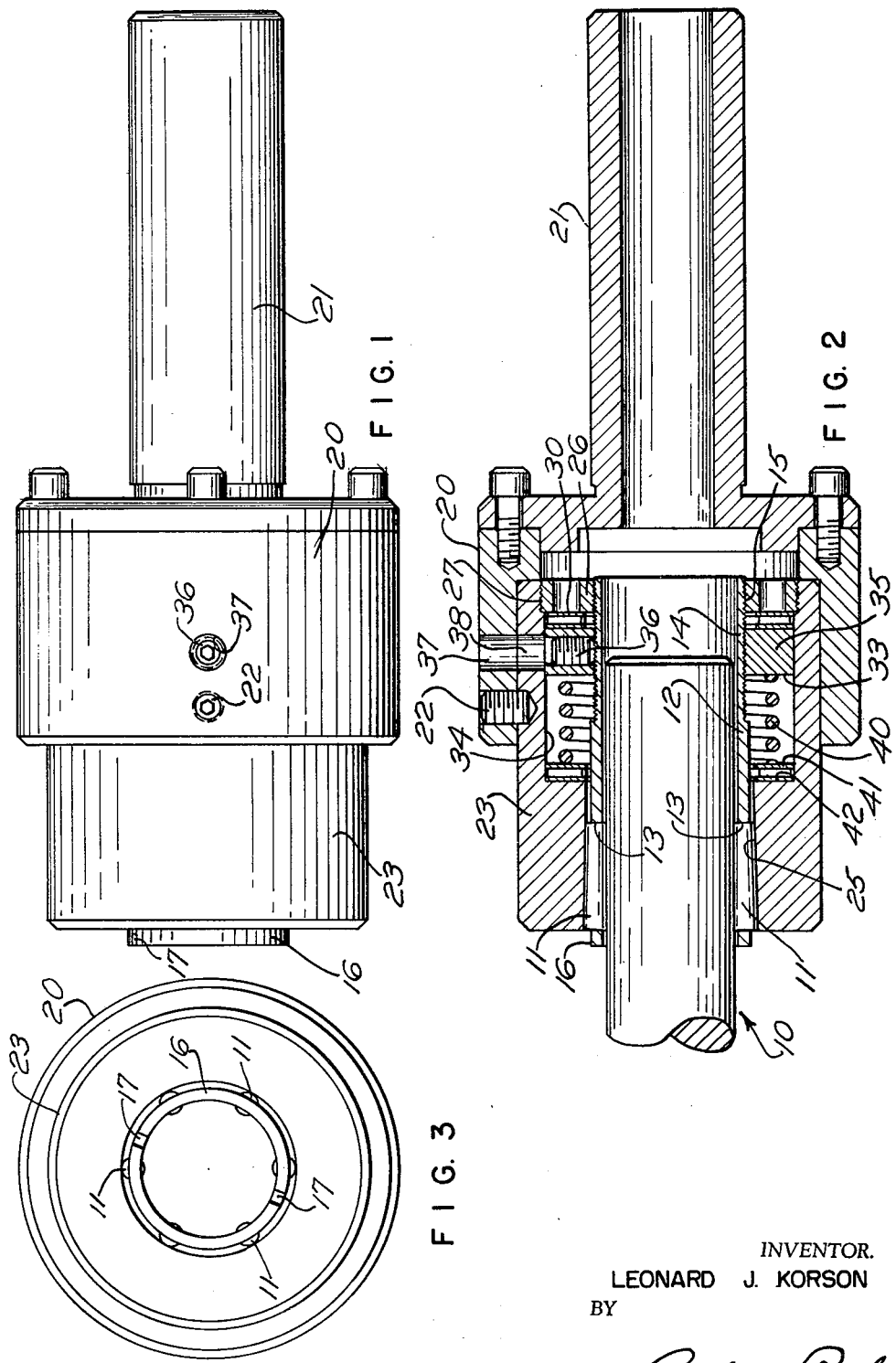
INVENTOR.
LEONARD J. KORSON
BY
*Barlow & Barlow*
ATTORNEYS

United States Patent Office 3,504,514
Patented Apr. 7, 1970

3,504,514
ROLLER BURNISHING TOOL
Leonard J. Korson, Manville, R.I., assignor to Madison Industries, Inc., a corporation of Rhode Island
Filed Sept. 20, 1967, Ser. No. 669,223
Int. Cl. B21c 37/30
U.S. Cl. 72—118                    4 Claims

ABSTRACT OF THE DISCLOSURE

A roller burnishing tool having frusto-conical rollers movable circularly in a planetary path to reduce the surface diameter of a workpiece and axially to adjust the diameter of their operation.

BACKGROUND OF THE INVENTION

Roller burnishing tools frequently have a number of parts put together for their functioning which requires a number of assembly operations increasing labor and cost of production and where adjustment is to be had usually require an additional threaded part to make this adjustment.

SUMMARY OF THE INVENTION

This burnishing tool is simple in its construction comprising a cage and a mandrel with a thrust bearing between and a threaded relation between the mandrel and the cage enabling adjustment to be had without the necessity of using a separate part.

BRIEF DESCRIPTION OF THE DRAWINGS

FIG. 1 is an elevational view of the tool;
FIG. 2 is a section of FIG. 1 with a workpiece engaged by the tool; and
FIG. 3 is an end view.

DESCRIPTION OF THE PREFERRED EMBODIMENT

In the drawings 10 designates generally a cylindrical workpiece which is engaged by a plurality of frusto-conical rollers 11 held in a cage 12 by means of slots 13 which extend axially of the cage and in spaced relation circularly about the cage. This cage is provided with an inwardly extending reduced portion 14 which is threaded as at 15. The forward end 16 of the cage is provided with a plurality of slots 17 spaced for the reception of a spanner wrench for rotating the cage.

The mandrel body portion 23 is received in a sleeve extension 20 of removably secured drive shank 21 and is secured thereto by means of set screw 22 engaging a recess in the body portion 23. This body portion 23 has a hollow interior which receives the cage 12 and provides a tapered surface 25 to engage the frusto-conical rolls 11 of the cage and confine them and urge them toward the workpiece 10 as rotation occurs. At the inner end of this mandrel there is provided an abutment member 26 which is threaded into the end of the mandrel as at 27. This abutment engages one side of the anti-friction needle thrust bearing 30.

An abutment 33 slidable in the bore 34 of the mandrel body 20 has threaded engagement with the threads 15 of the cage and is held in adjusted position along the cage by a threaded member 36. This abutment engages the other side of the anti-friction bearing 30. Access is had to the set screw 36 through openings 37 in the sleeve 20 and 38 in the body 23 of the mandrel. Abutment 33 is functionally fixed on the cage but may be adjusted along the cage for the varying work sizes. This adjustment may be had by loosening the set screw 36 through the openings 37, 38 and then by means of a spanner wrench engaging slots 17 in the end of the cage, the cage may be turned while the mandrel and abutment are held against turning so as to adjust the cage to move the frusto-conical rollers along the inclined surface 25 for different sizes of work. A relief spring 40 acts between abutment 33 and a washer or anti-friction bearing 41 engaging the shoulder 42 of the mandrel which permits relief from the work and withdrawal of the tool therefrom.

By the provision of threads on the cage and rotating the cage with reference to the abutment which is held in relation to the mandrel, the adjustment of the cage may be had for different size of work without the provision of an additional part to affect the movement of the cage, thus materially reducing parts which are provided for the operation of the device.

I claim:
1. A burnishing tool comprising:
   (a) a thrust bearing,
   (b) cage means equipped with tapered rollers and carrying an abutment engaging one side of said bearing,
   (c) mandrel means having a tapered surface to engage said rolls and carrying an abutment engaging the other side of said bearing,
   (d) both of said means having generally cylindrical surfaces and both of said abutments being radially extending annuli mounted on said surfaces,
   (e) one of said abutments being threaded onto its respective cylindrical surface for axial adjustment,
   (f) and resilient means urging said mandrel means and cage means in opposite directions.
2. A burnishing tool comprising:
   (a) a thrust bearing,
   (b) cage means equipped with tapered rollers and carrying an abutment engaging one side of said bearing,
   (c) mandrel means having a tapered surface to engage said rolls and carrying an abutment engaging the other side of said bearing,
   (d) the abutment carried by said cage means being threaded onto the cage means for axial adjustment,
   (e) and resilient means urging said mandrel means and cage means in opposite directions.
3. A burnishing tool as in claim 2 wherein said abutment is held fixed on said cage means by means accessible through the mandrel means.
4. A burnishing tool as in claim 2 wherein said cage means has an end accessible to be engaged for rotation relative to its abutment.

References Cited

UNITED STATES PATENTS 2,843,918   7/1958   Koppelmann _____ 29—90
3,130,477   4/1964   Gill _____ 29—90

LOWELL A. LARSON, Primary Examiner

U.S. Cl. X.R.
29—90; 72—126